Dec. 23, 1930. J. J. YOUNG 1,786,325
CALIPERS
Filed Nov. 19, 1929
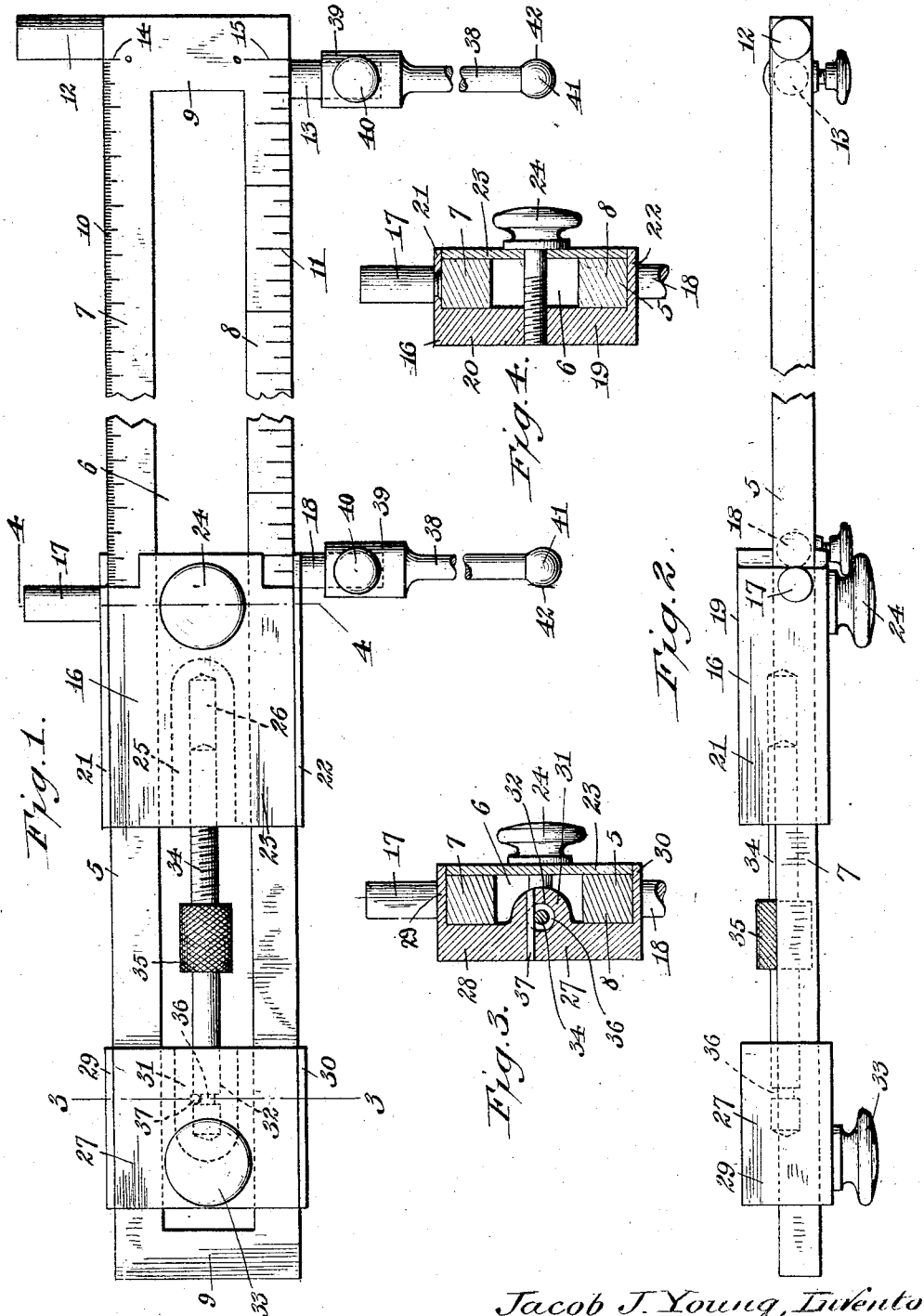

Patented Dec. 23, 1930

1,786,325

UNITED STATES PATENT OFFICE

JACOB J. YOUNG, OF BUFFALO, NEW YORK

CALIPERS

Application filed November 19, 1929. Serial No. 408,337.

My invention relates to improvements in calipers, and more particularly to that type designed for either taking inside or outside measurements of various objects.

Calipers of the type to which this invention relates, are particularly adapted for use in repair shops, although it may be used to advantage for all purposes which calipers are designed for.

In railroad repair shops there are many parts to be replaced, and it is exceedingly difficult to secure the exact measurements of the replaced parts, or the opening, seat, or depressed portion in which a replacing part is to be fitted; my improved calipers being designed to accurately determine exterior and interior dimensions, regardless of the depth of an opening, cavity, or depression in which the measurement is to be taken.

It also has for its object to provide an instrument of this kind constructed so that it can be quickly adjusted for rough dimensions or measurements, and in which micrometer arrangement is included for the purpose of making minute adjustments.

A further object of my invention is to provide calipers of simple and inexpensive construction, in which added gaging or measuring elements are provided for taking internal measurements of parts at considerable depth.

With the above and other objects in view to appear hereinafter, the invention consists in the novel features of construction, and in the combination and arrangement of parts to be hereinafter described and more particularly pointed out in the subjoined claims.

In the accompanying drawings:

Fig. 1 is a side elevation of the calipers, a portion being broken away to indicate added length.

Fig. 2 is a top or edge view of the same.

Fig. 3 is a transverse section taken on line 3—3, Fig. 1.

Fig. 4 is a transverse section taken on line 4—4, Fig. 1.

Reference being had to the drawings in detail, 5 designates the body-portion of the calipers, which is in the form of a flat elongated member having a longitudinal slot 6 extending from a point near one end thereof to a point near the other so as to provide two rule members 7, 8 connected together at their ends by the end portions 9. This elongated member or body portion may be constructed in one piece, or the rule members may be formed separately and connected together at their ends. At one or both sides of the rule members, suitable graduations 10, 11 are provided, these graduations being formed along the outer marginal portions of the rule members; the graduations 11 on one rule member being for the purpose of roughly adjusting the calipers to the approximately desired measurements, while the graduations 10 on the other rule member are for micrometrical adjustments, after having roughly adjusted the calipers with respect to the graduations 11.

Gaging studs 12, 13 extend in opposite directions from opposite edges of the elongated body portion at one end thereof. These gaging studs may be of any desired cross sectional formation, but I prefer to make them cylindrical. These studs are offset with respect to each other so that the outer side of the stud 13, which projects from the lower edge of the body-portion, is vertically alined with the inner side of the stud 12, and the graduations 10 and 11 have their zero marks 14, 15, respectively, in the same vertical line, these marks being numbered progressively in any desired manner from zero toward the opposite end of the body portion.

A gaging sleeve 16 surrounds and is slidable on the elongated body-portion and snugly fits the same. This sleeve has oppositely extending gaging studs 17, 18, the gaging stud 18 co-operating with the stud 13 on the elongated body-portion for taking internal measurements of cylinders, openings, cavities, or depressions, while the engaging stud 17 co-operates with the gaging stud 12 projecting from the upper edge of the elongated body-portion for taking exterior measurements of parts. These gaging studs 17, 18 are also offset with respect to each other, the outer side of the stud 18 being in vertical alinement with the inner side of the stud 17.

In taking exterior measurements, the part to be gaged or measured is placed between the studs 12 and 17, or the device is positioned so that these studs lie at opposite sides of the part to be gaged, and by moving the gaging sleeve 16 slowly to bring the stud 17 against one edge or side of the part, after positioning the other edge or side against the stud 12, the exact measurement will be indicated by the graduations 10. As clearly shown in Figs. 3 and 4, this sleeve comprises a channel-like member 19, consisting of a side wall 20, and integral top and bottom walls 21, 22. The other side of said sleeve is in the form of a flat plate 23 having its edges in contact with the inner sides of the top and bottom walls. The elongated body-portion 5 is positioned in this channel, or, in other words, between the side walls 20 and 23 of the gaging sleeve 16, and the edges thereof are in sliding contact with the inner surfaces of the top and bottom walls 21 and 22. This sleeve, or slide as it may be termed, is therefore open at opposite ends, and by suitable means is clamped to said body-portion so that it cannot move along the same. This is effected by a binding screw 24, which is passed through the flat member 23 serving as the adjustable side of the sleeve or slide, and it extends through the space between the side walls of said sleeve or slide and is threaded into the opposite side wall 20. Upon tightening the clamp screw 24, the adjustable side wall 23 of the sleeve is forced inwardly in binding contact with one side of the elongated body-portion 5, and these parts are therefore held against movement relatively. The sleeve or slide may, therefore, be said to be contractible.

The fixed wall 20 of the sleeve has an elongated protuberance 25 extending inwardly therefrom into the slot 6 in the elongated body-portion, and this elongated protuberance is provided with a screw-threaded bore 26.

27 designates an adjustable abutment sleeve or slide formed like the gaging sleeve 16, but being made somewhat shorter. This adjustable abutment sleeve or slide therefore has a channel member providing a side wall 28, a top wall 29 and a bottom wall 30, said side wall having an elongated protuberance 31 extending inwardly therefrom into the slot 6 in the elongated body-portion provided with a smooth bore 32, the bores 26 and 32 of the two sleeves or slides are therefore longitudinally alined and the open ends thereof are in opposed relation.

The adjustable side wall of the abutment sleeve or slide 27 has a binding screw 33 passed therethrough, which extends through the space between the two walls of the sleeve in the same manner as the binding screw 24 with respect to the gaging sleeve 16, and it is threaded into the opposite side wall of the sleeve to clamp the adjustable side against the elongated body in exactly the same manner provided in the gaging sleeve 16.

An adjusting device is provided for adjusting the gaging sleeve; it comprising an adjusting screw 34 which is threaded into the screw-threaded bore 26 formed in the gaging sleeve, and more particularly in the protuberance 25 in said sleeve, and it has a knurled enlargement 35 between its ends to facilitate rotating said screw. The opposite end of said adjusting screw is unthreaded and entered into the bore 32 formed in the protuberance 31 of the abutment sleeve to permit of rotation of the adjusting screw, while preventing lengthwise movement within said sleeve. The unthreaded end portion of this screw is provided with an annular groove 36 into which fits a pin 37 driven through the side wall 28 of said sleeve and the protuberance 31 on said side wall. The adjusting screw is therefore free to rotate within the abutment sleeve, but otherwise is held against movement.

In using the device, the binding screws 24 and 33 are unthreaded sufficiently to loosen the adjustable side walls of the two sleeves or slides 16 and 27. This maintains unchanging relation between the two sleeves or slides, both of which can be moved bodily along the elongated body-portion, either to position the two gaging studs 12 and 17 at opposite sides of the piece to be measured, or the two gaging studs 13 and 18 within an opening, cavity, or depressed portion. After thus positioning the studs, the binding screw of the abutment sleeve or slide 27 is tightened to clamp this slide immovably on the body-portion, after which the adjusting screw 34 may be rotated to adjust the pair of gaging studs used, accurately to the article or object being measured. When the gaging studs are finally arranged in accurately-measuring position, the binding screw 24 may be tightened to clamp the gaging sleeve 16. The fine graduations 10 will indicate the exact measurement of the desired part. The device can then be slipped from the article or object measured, or the article slipped from the device and the work proceeded with, assurance being had of accurate measurements having been taken. In some instances where the object or article, or the opening, cavity, or depression measured will not permit the calipers to be slipped off or out, the exact measurement on the graduations 10 can be noted, in which case it will not be necessary to tighten the binding screw 24, as the removal of the article or object from the device, or the device from the article or object, will necessitate changing of the relative position of the gaging studs used for taking the measurements. In the case, for instance, of measuring the exterior of an article or object, it may be found necessary to separate the gaging studs, while when taking internal measurements, the gaging studs may have to be moved closer together in order to remove them from their accurately measuring positions. In any event, accurate measurement will be noted, and in making a new part or a part to fit certain measurements, the calipers can be set accurately to the measurement noted and a proper fit assured.

I use in connection with the interior gaging studs extension legs 38. These are of particular advantage in measuring deep openings, cavities, or depressions, such as cylinders and like articles, or parts otherwise inaccessible. These extension legs have sockets 39 at their inner ends which receive the gage studs 13 and 18, and are held thereon by means of binding screws 40 threaded through the walls of said sockets and bearing firmly against said gage studs. At their outer ends these legs have substantially spherical terminals 41, the portion of the legs between these terminals and the sockets being of smaller diameter than the studs 13 and 17 to which these legs are applied. The outermost lateral points of these substantially spherical terminals are indicated by the numeral 42, and these may be referred to as contact points which are vertically alined with the outermost points of the gaging studs 13 and 18.

While I have thus provided lateral extensions at the terminals of the legs, these extensions may be otherwise formed than shown, but I have found a substantially spherical terminal to interfere least with parts of machinery when placing the extension legs into openings, cavities, or depressions.

It is to be noted therefore that the contact points 42 of the extension legs, the outermost regions of the interior gage studs 13 and 18, and the innermost regions of the exterior gage studs 12 and 17, are in true alinement, all being in alinement with the zero marks of the two series of graduations 10 and 11. The calipers may be provided with legs of different lengths, and these legs may be selectively employed, depending on the depth of the opening, cavity, or depression to be measured.

The arrangement of the graduations may also be changed and it is apparent that other changes in the construction and arrangement of parts may be made in the embodiment of my invention as herein disclosed within the scope of what is claimed, without departing from the spirit of this invention or sacrificing any of the advantages thereof.

Having thus described my invention, what I claim is:

1. Calipers, comprising an elongated body-portion having graduations along the same, a gaging element movable lengthwise on said body portion, co-operating gaging studs extending respectively from said body portion and said gaging element, and extension legs detachably secured to said studs and having lateral projections thereon providing contact points in alinement with the outermost regions of said gaging studs.

2. Calipers, comprising an elongated body-portion having a longitudinal slot therein, a sleeve longitudinally movable on said body-portion comprising side walls relatively movable and top and bottom walls integral with one of said side walls, the other of said side walls fitting between said top and bottom walls and lying in contact with one side of said body-portion, a binding screw passed through said last-mentioned side wall and threaded into the other side wall of said sleeve, and co-operating gage studs extending, respectively, from said body-portion and said sleeve.

In testimony whereof, I affix my signature.

JACOB J. YOUNG.